United States Patent
Gan

(10) Patent No.: US 10,459,300 B2
(45) Date of Patent: Oct. 29, 2019

(54) ARRAY SUBSTRATE AND A METHOD FOR FABRICATING THE SAME, A LIQUID CRYSTAL DISPLAY PANEL

(71) Applicant: Shenzhen China Star Optoelectronics Semiconductor Display Technology Co., Ltd., Shenzhen, Guangdong (CN)

(72) Inventor: Qiming Gan, Guangdong (CN)

(73) Assignee: Shenzhen China Star Optoelectronics Semiconductor Display Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 15/576,837

(22) PCT Filed: Jun. 26, 2017

(86) PCT No.: PCT/CN2017/089937
§ 371 (c)(1),
(2) Date: Nov. 26, 2017

(87) PCT Pub. No.: WO2018/209761
PCT Pub. Date: Nov. 22, 2018

(65) Prior Publication Data
US 2018/0335676 A1    Nov. 22, 2018

(30) Foreign Application Priority Data
May 18, 2017   (CN) .......................... 2017 1 0353231

(51) Int. Cl.
*G02F 1/1362*     (2006.01)
*G02F 1/1333*     (2006.01)
(Continued)

(52) U.S. Cl.
CPC ...... *G02F 1/136213* (2013.01); *G02F 1/1368* (2013.01); *G02F 1/13439* (2013.01);
(Continued)

(58) Field of Classification Search
CPC ......... G02F 1/136213; G02F 1/136227; G02F 1/136209; G02F 1/13439; G02F 1/133345;
(Continued)

(56) References Cited

U.S. PATENT DOCUMENTS 6,313,481 B1 *   11/2001   Ohtani .............. G02F 1/136213
                                                                257/376
6,690,031 B1     2/2004    Ohtani
(Continued)

FOREIGN PATENT DOCUMENTS

CN    105867037 A    8/2016
CN    106252356 A    12/2016
CN    106526997 A    3/2017

*Primary Examiner* — Phat X Cao
*Assistant Examiner* — Victor V Barzykin
(74) *Attorney, Agent, or Firm* — Andrew C. Cheng

(57) ABSTRACT

The present application discloses an array substrate and a method for fabricating the same, and a liquid crystal display panel. A transparent electrode and a second passivation layer are disposed between a planarization layer and a pixel electrode, the transparent electrode is disposed between the planarization layer and the second passivation layer, the pixel electrode and the transparent electrode are insulated and disposed in stack by the second passivation layer sandwiched therebetween, and forms a storage capacitor of the array substrate.

11 Claims, 3 Drawing Sheets

(51) Int. Cl.
*G02F 1/1343* (2006.01)
*G02F 1/1368* (2006.01)
*G02F 1/137* (2006.01)
*G02F 1/1335* (2006.01)
*G02F 1/136* (2006.01)

(52) U.S. Cl.
CPC .. *G02F 1/133345* (2013.01); *G02F 1/136209* (2013.01); *G02F 1/136227* (2013.01); *G02F 1/137* (2013.01); *G02F 1/133514* (2013.01); *G02F 2001/13606* (2013.01); *G02F 2001/13775* (2013.01); *G02F 2001/133357* (2013.01); *G02F 2001/134372* (2013.01)

(58) Field of Classification Search
CPC .................. G02F 1/1368; G02F 1/137; G02F 2001/13606; G02F 1/133514; G02F 2001/13775
See application file for complete search history.

(56) References Cited

U.S. PATENT DOCUMENTS

| | | | |
|---|---|---|---|
| 8,263,445 B2 | 9/2012 | Ting | |
| 2003/0117059 A1* | 6/2003 | Koo | H01L 27/3265 313/422 |
| 2005/0128399 A1* | 6/2005 | Kim | G02F 1/133707 349/129 |
| 2007/0065991 A1* | 3/2007 | Kim | G02F 1/13439 438/149 |
| 2011/0133193 A1* | 6/2011 | Song | H01L 27/12 257/59 |
| 2017/0343873 A1 | 11/2017 | Ma | |

\* cited by examiner

ARRAY SUBSTRATE AND A METHOD FOR FABRICATING THE SAME, A LIQUID CRYSTAL DISPLAY PANEL

FIELD OF THE INVENTION

The present application relates to a liquid crystal display technology field, and more particularly to an array substrate and a method for fabricating the same, a liquid crystal display panel.

BACKGROUND OF THE INVENTION

One pixel includes a Thin Film Transistor, TFT region and an aperture display area. When a gray scale voltage is applied to the TFT, a parasitic capacitance is generated between a gate electrode and a source electrode of the TFT, and the voltage generated by the capacitive coupling effect of the parasitic capacitance is the feed through voltage, it will pull down the gray scale voltage received by the pixel voltage, resulting in leakage, and affecting the display quality. At present, in order to meet the high resolution rate requirements of pixels, the pixel size is getting smaller and smaller. By the limitation of the current process, the size of TFT cannot be reduced unlimitedly, which makes the larger parasitic capacitance of the TFT, and the feed through voltage stays high to seriously affect the display quality.

SUMMARY OF THE INVENTION

In view of the above, the present application provides an array substrate and a method for fabricating the same, a liquid crystal display panel, which can increase the storage capacitor, thereby reducing the feed through voltage and improving the display quality.

An embodiment of the present application provides an array substrate includes a substrate, and a thin film transistor, a first passivation layer, a planarization layer and a pixel electrode sequentially formed on the substrate, wherein the array substrate further includes a transparent electrode and a second passivation layer are disposed between the planarization layer and the pixel electrode, the transparent electrode is disposed between the planarization layer and the second passivation layer, the pixel electrode and the transparent electrode are insulated and disposed in stack by the second passivation layer sandwiched therebetween, and forms a storage capacitor of the array substrate.

An embodiment of the present application provides a liquid crystal display panel, includes a color filter substrate and an array substrate opposite and spaced deposited, the array substrate includes a substrate and a thin film transistor, a first passivation layer, a planarization layer and a pixel electrode sequentially formed on the substrate, wherein the array substrate further includes a transparent electrode and a second passivation layer are disposed between the planarization layer and the pixel electrode, the transparent electrode is disposed between the planarization layer and the second passivation layer, the pixel electrode and the transparent electrode are insulated and disposed in stack by the second passivation layer sandwiched therebetween, and forms a storage capacitor of the array substrate.

An embodiment of the present application provides a method for fabricating an array substrate, include:
providing a substrate;
forming a thin film transistor, a first passivation layer, and a planarization layer sequentially on the substrate;
forming a transparent electrode on the planarization layer, and the transparent electrode is an integral structure and with an opening region;
covering a second passivation layer on the transparent electrode, wherein the second passivation layer, the planarization layer and the first passivation layer are provided with contact holes to expose the drain electrode of the thin film transistor, and the opening region of the transparent electrode exposes the contact holes; and
covering a pixel electrode on the second passivation layer, the pixel electrode is covered in the contact hole and is connected to the drain electrode of the thin film transistor, the pixel electrode and the transparent electrode are insulated and disposed in stack by the second passivation layer sandwiched therebetween, and forms a storage capacitor of the array substrate.

Advantageous effects: The application is characterized in that a transparent electrode is added between the planarization layer and the pixel electrode, the pixel electrode and the transparent electrode are insulated and disposed in stack by the second passivation layer sandwiched therebetween, and forms a storage capacitor of the array substrate to enhance the storage capacitor of the array substrate, the power supplied to the pixel electrode through the increased storage capacitor, and the leakage generated by the capacitive coupling effect of the parasitic capacitance of the TFT is compensated, that is equivalent to reduce the feed through voltage, thereby improving the display quality.

BRIEF DESCRIPTION OF THE DRAWINGS

In order to more clearly illustrate the embodiments of the present application or prior art, the following FIG.s will be described in the embodiments are briefly introduced. It is obvious that the drawings are merely some embodiments of the present application, those of ordinary skill in this field can obtain other FIG.s according to these FIG.s without paying the premise.

DETAILED DESCRIPTION OF PREFERRED EMBODIMENTS

Figure 1:
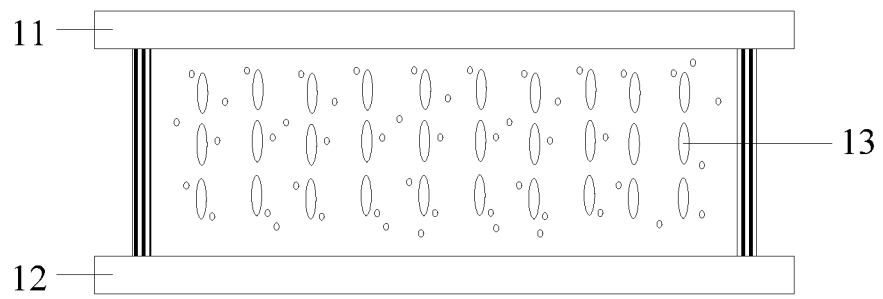
FIG. 1 is a cross-sectional view showing a structure of a liquid crystal display panel according to an embodiment of the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention.

In the drawings, the thickness of the layers and regions is exaggerated in order to clarify the device. The same reference numerals denote the same elements throughout the drawings.

It will also be understood that when an element is referred to as being "over" or "upper" on another element, it can be disposed directly on the other element, or an intermediate element can also be present.

Referring to FIG. 1, it is a liquid crystal display panel according to an embodiment of the present application. The liquid crystal display panel 10 can be a liquid crystal display panel based on a Polymer-Stabilized Vertical Alignment, PSVA technique, which includes a color filter substrate, CF substrate 11 and an array substrate (thin film Transistor Substrate, TFT substrate) 12 opposite and spaced deposited, and a liquid crystal molecules 13 filled between the two substrates, the liquid crystal molecules 13 are positioned in the liquid crystal cell superimposed by the color filter substrate 11 and the array substrate 12.

The color filter substrate 11 is provided with a common electrode, the common electrode can be an integral transparent conductive film such as Indium Tin Oxide, ITO thin film.

Figure 2:
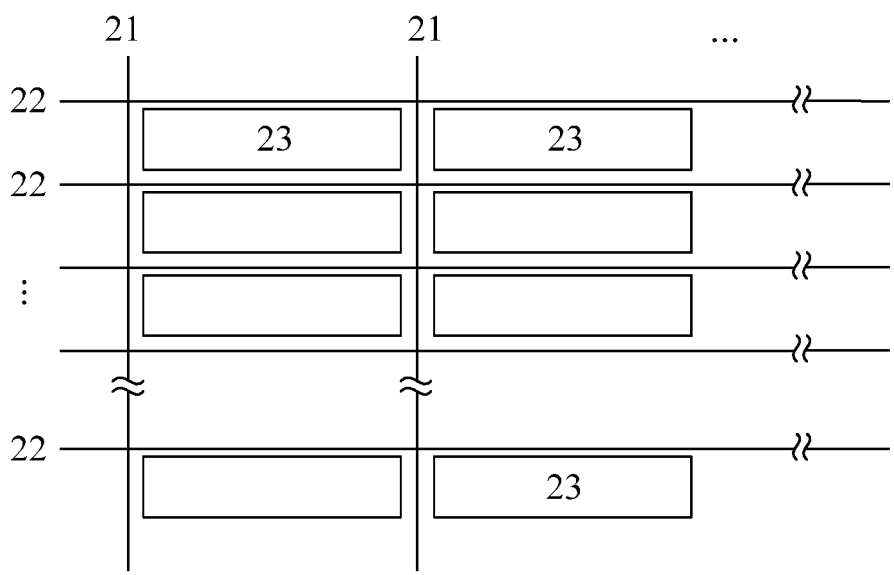
FIG. 2 is a schematic view of a pixel structure of the embodiment of the liquid crystal display panel shown in FIG. 1.
Figure 3:
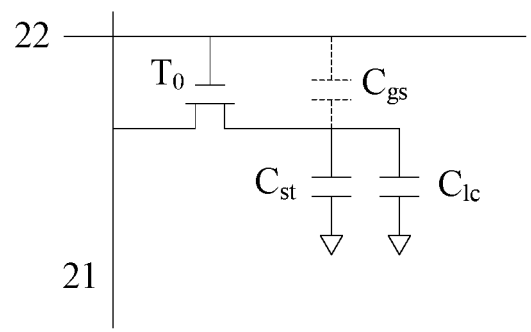
FIG. 3 is an equivalent circuit diagram of the pixel structure shown in FIG. 2.

Combined illustrated in FIG. 2, the array substrate 12 includes a plurality of data lines 21 extending in the column direction, a plurality of scanning lines 22 extending in the row direction, and a plurality of pixel regions 23 defined by the scanning lines 22 and the data lines 21. Each of the pixel regions 23 is connected to a corresponding data lines 21 and a scanning line 22, each of the scanning line 22 is connected to a gate driver to provide a scanning voltage for each pixel region 23, and each of the data lines 21 is connected to a source driver to provide a gray scale voltage for each pixel region 23. Referring to FIG. 3, each pixel region 23 includes a thin film transistor $T_0$, a storage capacitor $C_{st}$, and a liquid crystal capacitance $C_{lc}$, the liquid crystal capacitance $C_{lc}$ is formed by a pixel electrode, the common electrode on the side of the color filter substrate 11, and the liquid crystal molecule 13 disposed between the pixel electrode and the common electrode.

According to the display principle of the liquid crystal display panel 10, the thin film transistor $T_0$ located on the same row is turned on at the same time by inputting the scanning voltage to the scanning line 22, and the next row of the thin film transistor $T_0$ is turned after a period of time, and so on. Since the time of each row of the thin film transistor $T_0$ is turned on is relative short, the time for liquid crystal capacitor $C_{lc}$ be charged to control the deflection of the liquid crystal molecules 13 is short, the response time of the liquid crystal molecules 13 is difficult to be achieved. Therefore, the storage capacitor $C_{st}$ can hold the voltage of the pixel region 23 after the thin film transistor $T_0$ is turned off, and so as to provide time for the response of the liquid crystal molecules 13.

Figure 4:
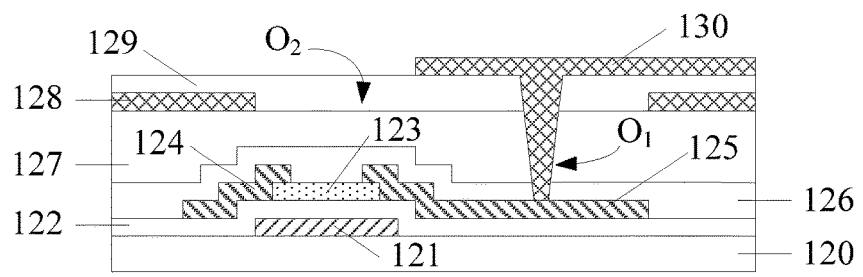
FIG. 4 is a cross-sectional view showing the structure of an array substrate according to a first embodiment of the present application.

Further, referring to FIG. 4, the array substrate 12 includes a substrate 120 and layer structures sequentially formed on the substrate 120: a gate electrode 121, a gate insulating layer (also known as a GI layer or an insulating layer), an active layer 123, a source-drain electrode layer formed by a source electrode 124 and a drain electrode 125, a first passivation layer, PV layer 126, a planarization layer, PLN layer 127, a transparent electrode 128, a second passivation layer 129, and a pixel electrode 130. wherein, the gate electrode 121, the insulating layer 122, the active layer 123, the source electrode 124, and the drain electrode 125 form the thin film transistor $T_0$ of the array substrate 12, and in view of the gate electrode 121 is located below the active layer 123, the pixel region 23 can be regarded as adapting the design of bottom gate pixels.

The second passivation layer 129, the planarization layer 127, and the first passivation layer 126 are provided with a contact hole $O_1$ for exposing the drain electrode 125 of the thin film transistor $T_0$. The transparent electrode 128 is an entire surface integral surface structure, but the transparent electrode 128 is provided with an opening region $O_2$ at a region overlapping with the contact hole $O_1$. The opening region $O_2$ may cover at least a part of planarization layer 127, at least a part of the first passivation layer 126, at least a part of the source electrode 124, at least a part of the drain electrode 125, and the active layer 123 in an orthographic projection direction of the substrate 120. The so-called overlapping region can be understood as the overlapping portion of the orthographic projections by the transparent electrode 128 and the contact hole $O_1$ the on the substrate 120, whereby the opening region $O_2$ can expose the contact hole $O_1$ and make the pixel electrode 130 covered in the contact hole $O_1$ and electrically connected to the drain electrode 125 of the thin film transistor $T_0$.

In the present embodiment, the transparent electrode 128 and the pixel electrode 130 are insulated and disposed in stack via the second passivation layer 129 sandwiched therebetween, thereby forming the storage capacitor $C_{st}$ shown in FIG. 3. During the display period of the liquid crystal display panel 10, the storage capacitor $C_{st}$ supplies power to the pixel electrode 130 to compensate for the leakage caused by the capacitive coupling effect of the parasitic capacitance $C_{gs}$, which corresponds to the reduction of the feed through voltage, and the reduction of the parasitic capacitance $C_{gs}$, the capacitance of the parasitic capacitance $C_{gs}$ is reduced, so that the display quality of the liquid crystal display panel 10 can be improved.

The transparent electrode 128 can be made of a light-transmitting material such as ITO (Indium Tin Oxide), so that the pixel aperture ratio is not affected. Further, since the transparent electrode 128 is an integral surface structure, not only making the storage capacitor $C_{st}$ has a larger capacitance, the feed through voltage can be welly reduced, and the size of the transparent electrode 128 with the integral surface is larger, so it can be fabricating easier.

Figure 5:
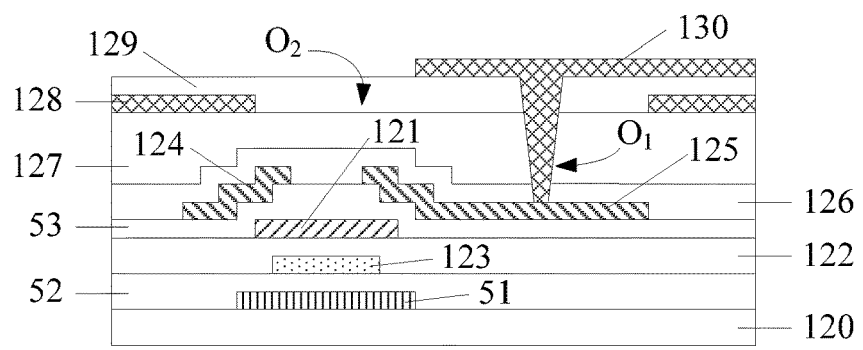
FIG. 5 is a cross-sectional view showing the structure of an array substrate according to a second embodiment of the present application.

The present application also provides an array substrate in accordance with the second embodiment, in order to facilitate the description to be distinguished from the above-described embodiments, the same reference numerals are assigned to the same structural elements therein. As shown in FIG. 5, the present embodiment differs from the embodiment shown in FIG. 4 in that, the thin film transistor $T_0$ includes a light blocking layer 51, a buffer layer 52, an active layer 123, an insulating layer 122, a gate electrode 121, an interlayer dielectric isolation layer, ILD layer 53, and a source-drain electrode layer formed by the source electrode 124 and the drain electrode 125 sequentially formed on the substrate 120. Since the gate electrode 121 and the insulating layer 122 of the thin film transistor $T_0$ are disposed above the active layer 123, the design of the storage capacitor $C_{st}$ of the present application is also applicable to the top gate type pixel design of the array substrate 12.

Figure 6:
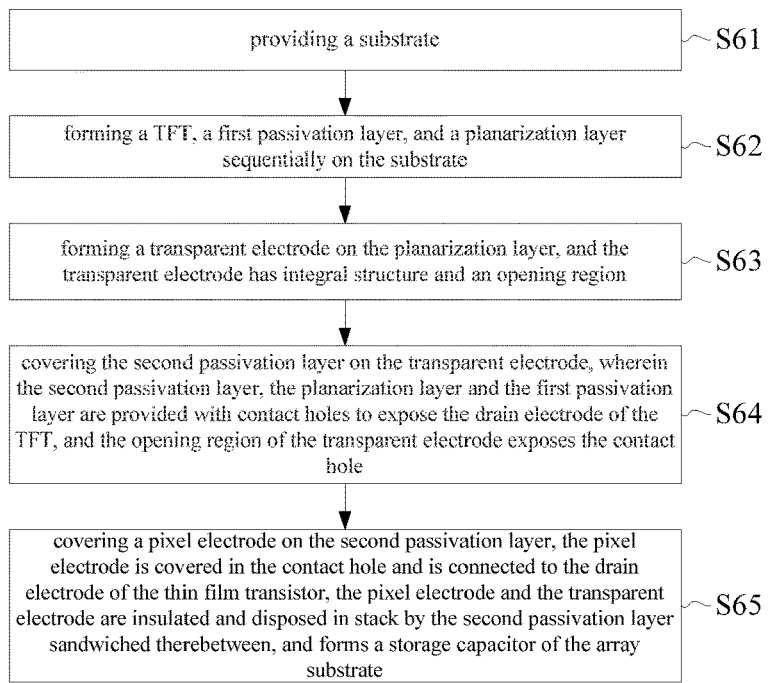
FIG. 6 is a schematic flow diagram of an embodiment of a method of fabricating an array substrate of the present application.

Referring to FIG. 6, FIG. 6 is a method for fabricating the array substrate according to an embodiment of the present application. The fabricating method can be used to form the array substrate 12 having the structure shown in FIG. 4 or FIG. 5. For ease of description, the method for fabricating of the present application will be described below is take an example of the array substrate 12 having the structure as shown in FIG. 4 with reference. The method for fabricating can include the following steps S61 to S65.

S61: providing a substrate.

Figure 7:
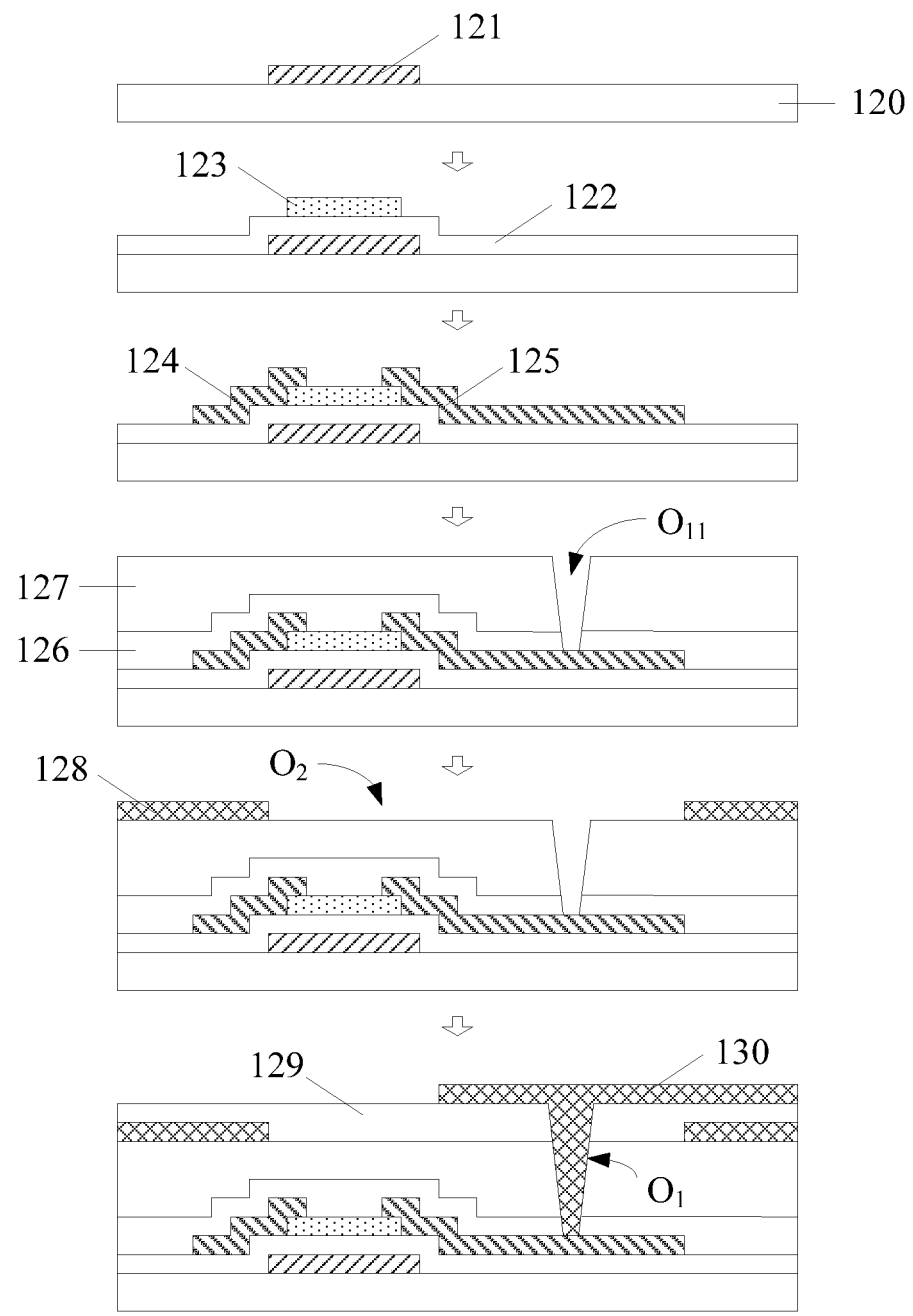
FIG. 7 is a scenario schematic view of the array substrate fabricated basing on the method shown in FIG. 6.

Combining with the illustration in FIG. 7, the substrate 120 includes, but is not limited to a light-transmitting substrate such as a glass substrate, a plastic substrate, a flexible substrate, or the like. Of course, the substrate 120 can also be provided with a passivation layer, that is, the substrate 120 includes a substrate and a passivation layer formed on the substrate, at which the substrate can be a glass substrate, a transparent plastic substrate or a flexible substrate, the material of the passivation layer includes, but is not limited to, silicon-nitrogen compounds such as $Si_3N_4$ (silicon nitride).

S62: forming a TFT, a first passivation layer, and a planarization layer sequentially on the substrate.

For the array substrate 12 designed for the bottom gate type pixel, the process of forming the TFT (i.e., the thin film transistor $T_0$ mentioned above) of the present application can include the following steps of:

First, forming an integral surface metal layer on the substrate 120 using a PVD (Physical Vapor Deposition) method in the present application, and then performing the patterning process to the integral surface of the metal layer, so that only the predetermined region of the metal layer is retained, thereby forming the gate electrode 121. Wherein the patterning process can include the processes of coating photoresist, exposure, development, etching, and the like. The specifically reference is made to the prior art, not to repeat here.

Then, in the present application, forming an integral surface of the insulating layer 122 to cover gate electrode 121 by CVD (Chemical Vapor Deposition) method. The material of the insulating layer 122 can be silicon oxide ($SiO_x$), or the insulating layer 122 includes a silicon oxide compound layer and a silicon nitride compound layer sequentially covering the gate electrode 121, such as a $SiO_2$ (silicon dioxide) layer and $Si_3N_4$ (silicon nitride) layer, to further improve the durable ability and insulation performance of the insulating layer.

Next, forming an integral surface of the active layer by the CVD method in the present application, and then performing the patterning process to the integral surface of the integral surface of the active layer, so as to only retain the region of the integral surface of the active layer located above the gate electrode 121, i.e., to form the active layer 123. Of course, the active layer 123 in the present application can also be formed directly by using the CVD method incorporating a mask plate having a predetermined pattern.

Finally, forming the source electrode 124 and the drain electrode 125 of the present application by using the same patterning process as using to form the gate electrode 121.

Continuously referring to FIG. 7, the first passivation layer 126 and the planarization layer 127 are integral surface structures sequentially covering on the thin film transistor $T_0$. Based on this, the first passivation layer 126 and the planarization layer 127 in the present application can be sequentially formed by the CVD method. Further, forming a contact hole $O_{11}$ in the first passivation layer 126 and the planarization layer 127 above drain electrode 125 to exposes the drain electrode 125 by etching or the like in the present application.

S63: forming a transparent electrode on the planarization layer, and the transparent electrode is an integral structure and with an opening region;

The transparent electrode 128 in the present application can be formed by using the PVD method and the patterning process. Wherein the integral surface of the transparent electrode is covered on the planarization layer 127 by the PVD method, and then, by the patterning process, such as etching process, to remove the region of the integral surface of the transparent conductive layer that overlap with the contact hole $O_{11}$, and making the region of the integral surface of the transparent electrode overlapped with the $O_{11}$ forms the opening region $O_2$, the so-called overlapping region can be understood as the overlapping portion of the orthographic projections by the transparent electrode 128 and the contact hole $O_1$ the on the substrate 120, whereby the opening region $O_2$ can expose the contact hole $O_{11}$.

Of course, the present application can also provide a mask plate having a hollow region and a non-hollow region on the planarization layer 127, and then depositing the transparent conductive material through the hollow region of the mask plate on the planarization layer 127, while the transparent conductive material is blocked by the non-hollow region of the mask plate and is not deposited on the planarization layer 127 to form the opening region $O_2$ of the transparent electrode 128.

S64: covering the second passivation layer on the transparent electrode, wherein the second passivation layer, the planarization layer and the first passivation layer are provided with contact holes to expose the drain electrode of the TFT, and the opening region of the transparent electrode exposes the contact hole.

The second passivation layer 129 in the present application can formed by using CVD method and the patterning process. Wherein, the integral surface of the second passivation layer 129 is formed by the PVD method, and then the contact hole is formed in the region of the second passivation layer 129 overlapping with the contact hole $O_{11}$ by the patterning process, the contact hole and the contact hole $O_{11}$ are tunneling to form the contact hole $O_1$.

S65: covering the pixel electrode on the second passivation layer, the pixel electrode is covered in the contact hole and is connected to the drain electrode of the TFT, the pixel electrode and the transparent electrode are insulated and disposed in stack via the second passivation layer sandwiched therebetween, and forming the storage capacitor of the array substrate.

The pixel electrode 130 in the present application can be formed by using the PVD method and the patterning process. The pixel electrode 130 is covered in the contact hole $O_1$ and is electrically connected to the drain electrode 125 of the thin film transistor $T_0$.

The array substrate 12 having the same structure as that shown in FIG. 4 or FIG. 5 can be formed by the above-described fabricating method, and thus has the same advantageous effects as the above.

Above are embodiments of the present application, which does not limit the scope of the present application. Any modifications, equivalent replacements or improvements within the spirit and principles of the embodiment described above should be covered by the protected scope of the invention.

What is claimed is:

1. An array substrate, comprising a substrate and a thin film transistor, a first passivation layer, a planarization layer and a pixel electrode sequentially formed on the substrate, wherein the array substrate further comprises a transparent electrode and a second passivation layer are disposed between the planarization layer and the pixel electrode, the transparent electrode is disposed between the planarization layer and the second passivation layer, the pixel electrode and the transparent electrode are insulated and disposed in stack by the second passivation layer sandwiched therebetween, and forms a storage capacitor of the array substrate;

wherein the thin film transistor comprises an active layer, a source electrode, and a drain electrode;

wherein the second passivation layer, the planarization layer, and the first passivation layer are provided with a contact hole for exposing the drain electrode of the thin film transistor, the transparent electrode is an integral surface structure and has an opening region, the opening region exposes the contact hole, and the pixel electrode covers in the contact hole and connects to the drain electrode of the thin film transistor;

wherein the opening region covers at least a part of the planarization layer, at least a part of the source electrode, at least a part of the drain electrode, and the active layer in an orthographic projection direction of the substrate.

2. The array substrate according to claim 1, wherein the fabricating material of the transparent electrode comprises Indium Tin Oxide, ITO.

3. The array substrate according to claim 1, wherein the thin film transistor further comprises a gate electrode, an insulating layer, and a source-drain electrode layer formed by the source electrode and the drain electrode; and the gate electrode, the insulating layer, the active layer, and the source-drain electrode layer are sequentially formed on the substrate.

4. The array substrate according to claim 1, wherein the thin film transistor further comprises a light blocking layer, a buffer layer, an insulating layer, a gate electrode, an interlayer dielectric isolation layer, and a source-drain electrode layer formed by the source electrode and the drain electrode; and the light blocking layer, the buffer layer, the active layer, the insulating layer, the gate electrode, the interlayer dielectric isolation layer, and the source-drain electrode layer are sequentially formed on the substrate.

5. A liquid crystal display panel, wherein the liquid crystal display panel comprises a color filter substrate and an array substrate opposite and spaced deposited, the array substrate comprises a substrate and a thin film transistor, a first passivation layer, a planarization layer and a pixel electrode sequentially formed on the substrate, wherein the array substrate further comprises a transparent electrode and a second passivation layer are disposed between the planarization layer and the pixel electrode, the transparent electrode is disposed between the planarization layer and the second passivation layer, the pixel electrode and the transparent electrode are insulated and disposed in stack by the second passivation layer sandwiched therebetween, and forms a storage capacitor of the array substrate;

wherein the thin film transistor comprises an active layer, a source electrode, and a drain electrode;

wherein the second passivation layer, the planarization layer, and the first passivation layer are provided with a contact hole for exposing the drain electrode of the thin film transistor, the transparent electrode is an integral surface structure and has an opening region, the opening region exposes the contact hole, the pixel electrode covers within the contact hole and connects to the drain electrode of the thin film transistor;

wherein the opening region covers at least a part of the planarization layer, at least a part of the source electrode, at least a part of the drain electrode, and the active layer in an orthographic projection direction of the substrate.

6. The liquid crystal display panel according to claim 5, wherein the fabricating material of the transparent electrode comprises Indium Tin Oxide, ITO.

7. The liquid crystal display panel according to claim 5, wherein the thin film transistor further comprises a gate electrode, an insulating layer, and a source-drain electrode layer formed by the source electrode and the drain electrode sequentially formed on the substrate; and the gate electrode, the insulating layer, the active layer, and the source-drain electrode layer are sequentially formed on the substrate.

8. The liquid crystal display panel according to claim 5, wherein the thin film transistor further comprises a light blocking layer, a buffer layer, an insulating layer, a gate electrode, an interlayer dielectric isolation layer, and a source-drain electrode layer formed by the source electrode and the drain electrode; and the light blocking layer, the buffer layer, the active layer, the insulating layer, the gate electrode, the interlayer dielectric isolation layer, and the source-drain electrode layer are sequentially formed on the substrate.

9. A method for fabricating an array substrate, comprising:

providing a substrate;

forming a thin film transistor, a first passivation layer, and a planarization layer sequentially on the substrate, wherein the thin film transistor comprises an active layer, a source electrode, and a drain electrode;

forming a transparent electrode on the planarization layer, and the transparent electrode is an integral structure and with an opening region, wherein the opening region covers at least a part of the planarization layer, at least a part of the source electrode, at least a part of the drain electrode, and the active layer in an orthographic projection direction of the substrate;

covering a second passivation layer on the transparent electrode, wherein the second passivation layer, the planarization layer and the first passivation layer are provided with contact holes to expose the drain electrode of the thin film transistor, and the opening region of the transparent electrode exposes the contact holes; and covering a pixel electrode on the second passivation layer, the pixel electrode is covered in the contact hole and is connected to the drain electrode of the thin film transistor, the pixel electrode and the transparent electrode are insulated and disposed in stack by the second passivation layer sandwiched therebetween, and forms a storage capacitor of the array substrate.

10. The method for fabricating an array substrate according to claim 9, wherein the step of forming a transparent electrode on the planarization layer comprises:

providing a mask plate having a hollow region and a non-hollow region on the planarization layer; and depositing the transparent conductive material through the hollow region of the mask plate on the planarization layer, while the transparent conductive material is blocked by the non-hollow region of the mask plate and is not deposited on the planarization layer to form the opening region of the transparent electrode.

11. The method for fabricating an array substrate according to claim 9, wherein the step of forming a transparent electrode on the planarization layer comprises:
covering an integral surface of the transparent electrode on the planarization layer; and
performing an etching process to the integral surface of the transparent conductive layer to remove the region of the integral surface of the transparent electrode overlapped with the contact hole.

* * * * *